United States Patent
Obayashi et al.

(10) Patent No.: US 7,432,609 B2
(45) Date of Patent: Oct. 7, 2008

(54) EXHAUST GAS-DRIVEN GENERATOR SYSTEM AND METHOD OF CONTROLLING ELECTRICAL SYSTEM

(75) Inventors: Kazuyoshi Obayashi, Chita-gun (JP); Keisuke Tani, Nagoya (JP); Hiroshi Tamura, Nagoya (JP); Masami Fujitsuna, Kariya (JP)

(73) Assignee: Denso Corporation, Kariya (JP)

( * ) Notice: Subject to any disclaimer, the term of this patent is extended or adjusted under 35 U.S.C. 154(b) by 366 days.

(21) Appl. No.: 11/232,036

(22) Filed: Sep. 22, 2005

(65) Prior Publication Data

US 2006/0113799 A1 Jun. 1, 2006

(30) Foreign Application Priority Data

Dec. 1, 2004 (JP) ............................. 2004-349044

(51) Int. Cl.
*F02D 29/06* (2006.01)
*H02P 9/04* (2006.01)
*F01D 15/10* (2006.01)
*F02C 6/00* (2006.01)
*H02K 7/18* (2006.01)
*H02H 7/06* (2006.01)
*H02P 9/00* (2006.01)
*H02P 11/00* (2006.01)
*H02J 1/10* (2006.01)
*H02J 3/38* (2006.01)
*H02J 7/34* (2006.01)

(52) U.S. Cl. ................... 290/40 C; 290/408; 290/52; 322/36; 307/18

(58) Field of Classification Search ............... 290/40 B, 290/52, 40 C; 322/36; 307/18
See application file for complete search history.

(56) References Cited

U.S. PATENT DOCUMENTS

| | | | | |
|---|---|---|---|---|
| 4,038,558 A | * | 7/1977 | Gallois | 290/52 |
| 4,253,031 A | * | 2/1981 | Frister | 290/52 |
| 4,394,582 A | * | 7/1983 | Kreissl et al. | 290/4 C |
| 4,499,534 A | * | 2/1985 | Schnetzka et al. | 363/129 |
| 4,694,653 A | * | 9/1987 | Kawamura | 60/597 |
| 4,694,654 A | * | 9/1987 | Kawamura | 60/597 |
| 4,745,754 A | * | 5/1988 | Kawamura | 60/608 |
| 4,745,755 A | * | 5/1988 | Kawamura | 60/608 |
| 4,757,686 A | * | 7/1988 | Kawamura et al. | 60/608 |
| 4,769,993 A | * | 9/1988 | Kawamura | 60/597 |
| 4,833,887 A | * | 5/1989 | Kawamura et al. | 60/608 |
| 4,864,151 A | * | 9/1989 | Wyczalek et al. | 290/52 |
| 4,886,978 A | * | 12/1989 | Kawamura | 290/52 |
| 5,298,854 A | * | 3/1994 | McEachern et al. | 324/142 |
| 5,298,859 A | * | 3/1994 | McEachern et al. | 324/142 |
| 5,307,009 A | * | 4/1994 | McEachern et al. | 324/142 |

(Continued)

FOREIGN PATENT DOCUMENTS

JP A 2000-045817 2/2000
JP A 2004-260908 9/2004

*Primary Examiner*—Nicholas Ponomarenko
*Assistant Examiner*—Pedro J Cuevas
(74) *Attorney, Agent, or Firm*—Oliff & Berridge, PLC (57) ABSTRACT

An amount of electric power generatable by an exhaust gas-driven rotating electric machine is determined corresponding to an operating point, so that an increment amount of fuel by the exhaust gas-driven electric power generation is smaller than engine-driven alternator power generation. The power generation can be thereby performed by effectively utilizing exhaust energy of the engine.

6 Claims, 4 Drawing Sheets

U.S. PATENT DOCUMENTS

| | | | | |
|---|---|---|---|---|
| 5,313,797 A * | 5/1994 | Bidwell | | 60/597 |
| 5,698,969 A * | 12/1997 | Gyugyi | | 323/207 |
| 5,968,456 A * | 10/1999 | Parise | | 422/174 |
| 6,172,427 B1 * | 1/2001 | Shinohara et al. | | 290/40 B |
| 6,486,569 B2 * | 11/2002 | Couture | | 307/98 |
| 6,758,042 B2 * | 7/2004 | Huang | | 60/597 |
| 6,931,850 B2 * | 8/2005 | Frank et al. | | 60/608 |
| 6,963,187 B2 * | 11/2005 | Bebic et al. | | 323/207 |
| 6,986,247 B1 * | 1/2006 | Parise | | 60/284 |
| 7,062,361 B1 * | 6/2006 | Lane | | 700/295 |
| 7,096,156 B2 * | 8/2006 | Hosaka et al. | | 702/182 |
| 7,100,369 B2 * | 9/2006 | Yamaguchi et al. | | 60/324 |
| 7,177,727 B2 * | 2/2007 | Chu et al. | | 700/287 |
| 7,178,332 B2 * | 2/2007 | Sasaki | | 60/320 |
| 7,181,912 B2 * | 2/2007 | Mori | | 60/616 |
| 7,336,000 B2 * | 2/2008 | Stahlhut et al. | | 290/52 |
| 2002/0005668 A1 * | 1/2002 | Couture | | 307/98 |
| 2004/0088977 A1 * | 5/2004 | Huang | | 60/607 |
| 2004/0163858 A1 * | 8/2004 | Borrego Bel et al. | | 180/65.1 |
| 2004/0164616 A1 * | 8/2004 | Obayashi et al. | | 307/18 |
| 2004/0204908 A1 * | 10/2004 | Hosaka et al. | | 702/182 |
| 2005/0050887 A1 * | 3/2005 | Frank et al. | | 60/597 |
| 2006/0053785 A1 * | 3/2006 | Mori | | 60/520 |
| 2006/0113799 A1 * | 6/2006 | Obayashi et al. | | 290/40 B |
| 2006/0122737 A1 * | 6/2006 | Tani et al. | | 700/286 |
| 2006/0229767 A1 * | 10/2006 | Chu et al. | | 700/286 |
| 2007/0273210 A1 * | 11/2007 | Wang et al. | | 307/45 |
| 2007/0273211 A1 * | 11/2007 | Wang et al. | | 307/45 |
| 2007/0273213 A1 * | 11/2007 | Wang et al. | | 307/66 |
| 2007/0273214 A1 * | 11/2007 | Wang et al. | | 307/72 |
| 2007/0274113 A1 * | 11/2007 | Wang et al. | | 363/109 |
| 2007/0293156 A1 * | 12/2007 | Yuen et al. | | 455/63.3 |
| 2008/0051945 A1 * | 2/2008 | Kates | | 700/295 |
| 2008/0097664 A1 * | 4/2008 | Aoyama et al. | | 701/36 |
| 2008/0122228 A1 * | 5/2008 | Liu et al. | | 290/40 C |

* cited by examiner

EXHAUST GAS-DRIVEN GENERATOR SYSTEM AND METHOD OF CONTROLLING ELECTRICAL SYSTEM

CROSS REFERENCE TO RELATED APPLICATION

This application is relates to and incorporates herein by reference Japanese Patent Application No. 2004-349044 filed on Dec. 1, 2004.

FIELD OF THE INVENTION

The present invention relates to an exhaust gas-driven generator system and a method of controlling an electric system of a vehicle.

BACKGROUND OF THE INVENTION

Various electric systems for vehicles are proposed for instance in US 2004/0164616A1 (JP 2004-260908A).

Turbo generators for performing electric power generation by utilizing excess of exhaust energy used by a turbocharger are proposed in JP 2000-45817A. A turbo generator is configured to include a generator turbine disposed parallel with a turbocharger and an alternating current (AC) generator for performing power generation in direct connection with the generator turbine. The generator turbine is rotated by absorbing exhaust gas energy (exhaust energy) flowing through a waste gate valve that opens when the gas pressure of the turbocharger reaches a predetermined value. With the rotation, the AC generator directly coupled to the generator turbine performs electric power generation. However, occurrence of such a high engine output as to cause exhaust flow to the waste gage valve is not so frequent that the effect of utilizing the exhaust energy is not exhibited to satisfaction.

SUMMARY OF THE INVENTION

The present invention therefore has an object to provide an exhaust gas-driven generator system capable of performing power generation by effectively utilizing exhaust energy and to provide an electric system control method.

The present invention is based on a finding that, if a turbo generator is operated to generate even under a low engine output state, power generation will increase exhaust resistance causing a decrease in the engine output. To avoid this engine output decrease, it is necessary to increase fuel. It is thus desired to generate electric power by determining which one of power generation by an AC generator and power generation by an exhaust gas-driven generator is more economical.

According to one aspect, a generator system has an AC generator that performs power generation by utilizing drive forces of an engine and an exhaust gas-driven generator that performs power generation by utilizing exhaust gas energy of the engine. A control device determines a generatable amount of power (amount of power that can be generated) in correspondence to an operating point of the engine. The generatable amount of power indicates an amount of electric power generatable by the exhaust gas-driven generator with an increment amount of fuel smaller than an increment amount of fuel for the engine necessary for the power generation by the generator.

According to a further aspect, an electrical system performs power supply to an electrical load and a battery from a plurality of power energy supply sources including an exhaust gas-driven generator that performs power generation by utilizing exhaust energy of an engine and an AC generator that performs power generation by utilizing drive forces of the engine. A control device calculates information of power costs each coinciding with a cost per unit amount of electric power of respective one of the power energy supply sources and suppliable amounts of power (amounts of power that can be supplied) of the respective power energy supply sources. The control device adjusts power supply allocation ratios of the power energy supply sources and a received power allocation ratio of the electrical load or a battery in accordance with the information in a direction along which the power energy is reduced. For the exhaust gas-driven generator, a generatable amount of power indicating an amount of power generatable by the exhaust gas-driven generator is used as the suppliable amount of power. The amount of power is determined corresponding to an operating point of the engine. An increment amount of fuel for the engine which increment amount is necessary for generation of the suppliable amount of power is used as the power cost.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

First Embodiment

Figure 1:
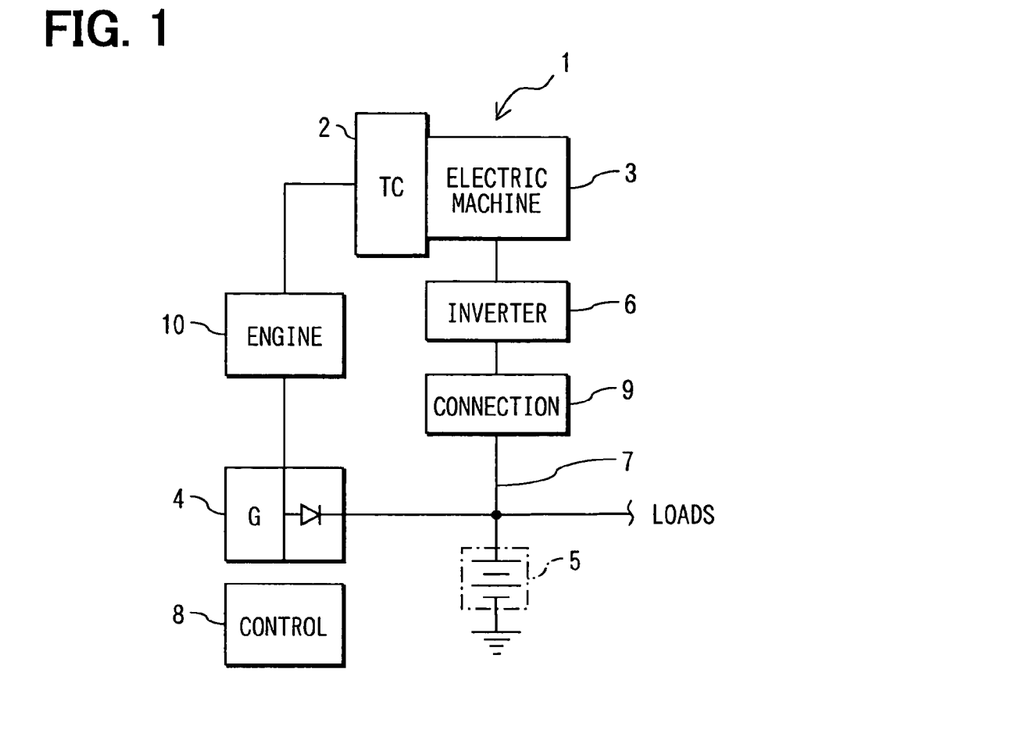
FIG. 1 is a block diagram showing an electric system of an exhaust gas-driven generator system according to a first embodiment of the present invention.

Referring first to FIG. 1, an exhaust gas-driven generator apparatus 1 includes an electrically-operated turbocharger 2 and a rotary electric machine 3 or an AC rotating electric machine directly connected to a rotation shaft of the turbocharger 2.

The turbocharger 2 may be driven by the rotary electric machine 3 to thereby perform compression of intake air of an engine 10. When the turbocharger 2 is not driven by the rotary electric machine 3, it rotates by absorbing exhaust gas energy of the engine 10. With rotational forces of the turbocharger 2, the rotary electric machine 3 performs electric power generation (exhaust gas-driven generation).

An inverter 6 converts DC power, supplied from a power bus 7, to AC power to thereby supply the electric power to the rotary electric machine 3. In addition, the inverter 6 rectifies the AC power generated by the rotary electric machine 3 and supplies the rectified power to the power bus 7.

An AC generator 4 is an exciting-coil type three-phase synchronization generator that performs electric power generation by utilizing drive forces of the engine 10. The generator 4 includes rectifiers 4a mounted therein. A battery 5 is charged by the power generated by, for example, the rotary electric machine 3 and the generator 4. The power bus 7 is connected to the generator 4, the battery 5, the inverter 6, and many other electrical loads (not shown), thereby to enable power supply to, for example, the battery 5 and electrical loads.

A power control device 8 is, primarily, a microcomputer, and has functions of various sections. The sections are a generator control section for controlling an exciting current of the generator 4; an engine control section for controlling the output of the engine 10; a connection/disconnection control section for controlling connection/disconnection of a power bus connection section 9; an exhaust gas-driven generation control section for controlling the rotary electric machine 3 by using the inverter 6; and an instructing section for issuing commands to the respective control sections. The generator control section and the exhaust gas-driven generation control section respectively control the generator 4 in accordance with a voltage command for the voltage of the power bus 7 from the instructing section. The generator control section, the engine control section and the exhaust gas-driven generation control section may be implemented by separate control devices.

In the above system including two generators 3 and 4, the generator 4 is controlled to utilize as a master of voltage control of the power bus 7. The output of the engine 10 is controlled to utilize the rotary electric machine 3 serving as an exhaust gas-driven generator for power control. Thus, interference between the two generators can be thereby avoided.

The power bus connection section 9 is used to disconnect the connection between the inverter 6 and the power bus 7. When control of the rotary electric machine 3 is disabled, the connection section 9 disconnects the connection between the inverter 6 and the power bus 7.

As a result, the control of the rotary electric machine 3 is disabled. Consequently, even when the power generation by the rotary electric machine 3 is overproduced potentially leading to an abnormal rise of the voltage level of the power bus 7 to an abnormal level, the connection between the rotary electric machine 3 and the power bus 7 is disconnected so that such abnormal voltage rise can be prevented.

As described above, unlike the conventional turbo generator, the exhaust gas-driven generator system of this embodiment utilizes not only completely discarded exhaust energy but also non-discarded exhaust energy, in other words, exhaust energy that, when it is used, still increases the amount of fuel consumption due to increased intake airflow.

When utilizing the non-discarded exhaust energy, attention should be paid as well to differences in economical viewpoint from other power generation methods such as those using an alternator. In other words, in the event of generating a certain amount of power, when the amount of fuel consumption for power generation by utilizing the exhaust energy is greater than the amount of fuel consumption for power generation by using drive forces of the engine 10, the exhaust energy is not necessarily effectively used.

Therefore, in the present embodiment, in accordance with operating points of the engine 10 such as those of the engine speed and engine output torque, a determination is made for an amount of power (generatable amount of power) generatable by the rotary electric machine 3 which serves as the exhaust gas-driven generator with an increment amount of fuel smaller than an increment amount of fuel for the engine 10 necessary for power generation by the generator 4. Then, the output of the engine 10 is controlled in accordance with the generatable amount of power.

Figure 2:
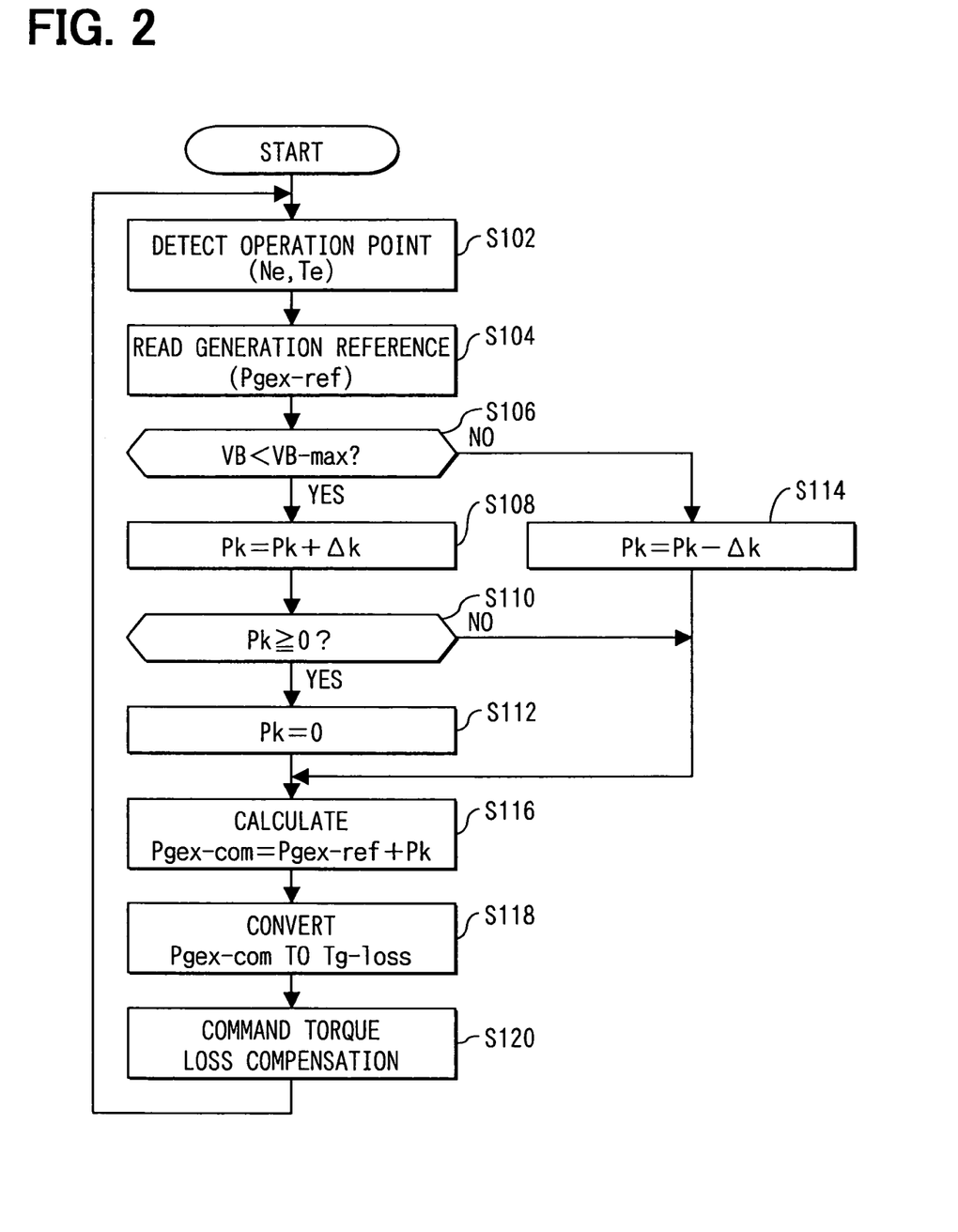
FIG. 2 is a flow diagram showing a flow of a determination process of a generation amount of power generated by exhaust gas-driven generation.

A generation-power amount determination process for determining the generation amount of power for being generated by exhaust gas-driven generation will be described hereinbelow with reference to a flow diagram of FIG. 2. The determination process is executed by the power control device 8.

First, at step (S) 102, the power control device 8 detects a present operating point of the engine (engine operation point). In the present embodiment, while the engine speed Ne and the engine output torque Te are used as the engine operation points, the engine output torque Te may be substituted with an intake air amount or an engine cylinder pressure.

Figure 3:
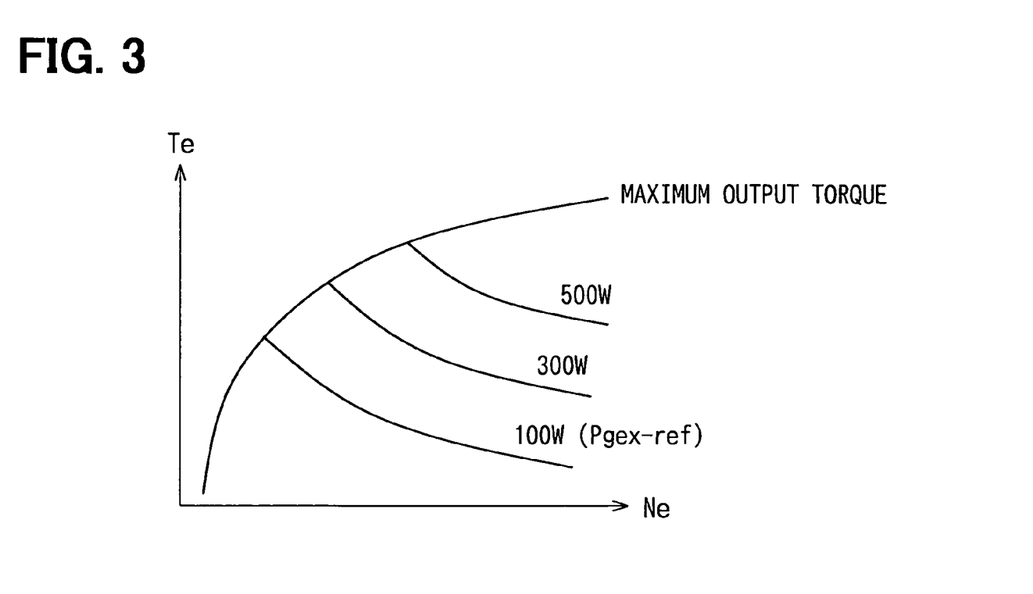
FIG. 3 is a graph showing an exhaust gas-driven generation map corresponding to engine operation points.

At S104, a power generation reference amount Pgex-ref is read from a pre-stored mapped data defining a relation between an exhaust gas-driven generation and engine operation points as shown in FIG. 3. In this figure, only 100 W, 300 W and 500 W are indicated as examples of Pgex-ref. This exhaust gas-driven generation map data is determined in the following manner. The generatable amount of power indicative of the amount of power, i.e., the power generation reference amount Pgex-ref, which is generatable by the exhaust gas-driven generation by the rotary electric machine 3 with the increment amount of fuel smaller than the increment amount of fuel for the engine 10 necessary for the power generation by the generator 4 is preliminarily calculated in accordance with the relationship between an engine speed Ne and an engine output torque Te. The engine speed Ne and the engine output torque Te determine the respective engine operation point indicative of the operation state of the engine 10.

The exhaust gas-driven generation map data shown in FIG. 3 is set such that the generatable amount of power increases proportionally to the increase in the engine output. More specifically, since the exhaust energy thus increases as the engine output increases, the energy usable for the exhaust gas-driven generation increases. As such, when the energy usable for the exhaust gas-driven generation increases, the generatable amount of power proportionally increases. Consequently, it can be determined so that as the engine output becomes higher, the generatable amount of power becomes greater.

In addition, power generation can become implemented even without an additional amount of fuel (increment amount of fuel) in the event where the gas pressure of the turbocharger 2 becomes a predetermined value or greater to thereby cause the exhaust to be bypassed through the waste gage valve.

At S106, a bus voltage VB of the power bus 7 is measured to detect the power generation of the generator 4 and compared with a set upper limit value VB-max. The upper limit value VB-max is set to be greater than a voltage regulation value of the generator 4.

When the bus voltage VB is smaller than the upper limit value VB-max, then the process proceeds to S108. Alternatively, when the bus voltage VB is not smaller than the upper limit value VB-max, the process proceeds to S114.

At S108, a predetermined amount of power Δk (about several watts) is added to a compensatory amount of power Pk. At S110, it is determined whether or not the compensatory amount of power Pk is greater than or equal to 0. When Pk is greater than or equal to 0, the compensatory amount of power Pk is set to 0 at S112. When Pk is smaller than 0, while keeping the existing value of the compensatory amount of power Pk, the process proceeds to S116. On the other hand, at S114, since the bus voltage VB is not smaller than the upper limit value VB-max, the process performs the subtraction of the predetermined amount of power Δk from the compensatory amount of power Pk, and then proceeds to S116.

At S116, an exhaust gas-driven generation command Pgex-com is calculated in accordance with the following equation.

$$Pgex\text{-}com = Pgex\text{-}ref + Pk$$

Accordingly, in the event the bus voltage VB is not smaller than the upper limit value VB-max, the amount of power obtained by reducing the compensatory amount of power Pk from the power generation reference amount Pgex-ref can be set to the exhaust gas-driven generation command Pgex-com. Consequently, the voltage level of the power bus 7 can be prevented from being over-raised with excessive exhaust gas-driven generation.

As described above, the exhaust gas-driven generation command Pgex-com is variably set corresponding to the voltage of the power bus 7, whereby exhaust gas-driven generation control can be implemented in cooperation with the voltage control of the generator 4. At S118, the exhaust gas-driven generation command Pgex-com calculated at S116 is converted into a loss Tg-loss of the engine output torque caused by the exhaust gas-driven generation.

At S120, a torque compensation command is issued for compensating for the loss Tg-loss of the engine output torque. The torque compensation command is input to the engine control section. In response, the engine control section controls by adding the loss Tg-loss of the engine output torque to an output torque command being issued for the engine 10. This enables restraining variations of the engine output torque being caused by the exhaust gas-driven generation.

In this manner, in the exhaust gas-driven generator system of the present embodiment, the determination is made for the generatable amount of power Pgex-ref generatable by the rotary electric machine 3 with the increment amount of fuel smaller than the increment amount of fuel for the engine 10 necessary for the power generation by the generator 4. Then, the data processing of the engine 10 is controlled in accordance with the generatable amount of power. With this, the costs necessary for the power generation are reduced, so that the power generation can be performed by effectively utilizing the exhaust energy. Consequently, fuel cost improvement can be implemented.

In the present embodiment, while the engine speed Ne and the engine output torque Te are used as the engine operation points, the mean effective pressure of a piston of the engine 10, vehicle speed, driving torque, gear shift position (ratio) or the like may be used as a substitute of the engine output torque (Te).

Second Embodiment

Figure 4:
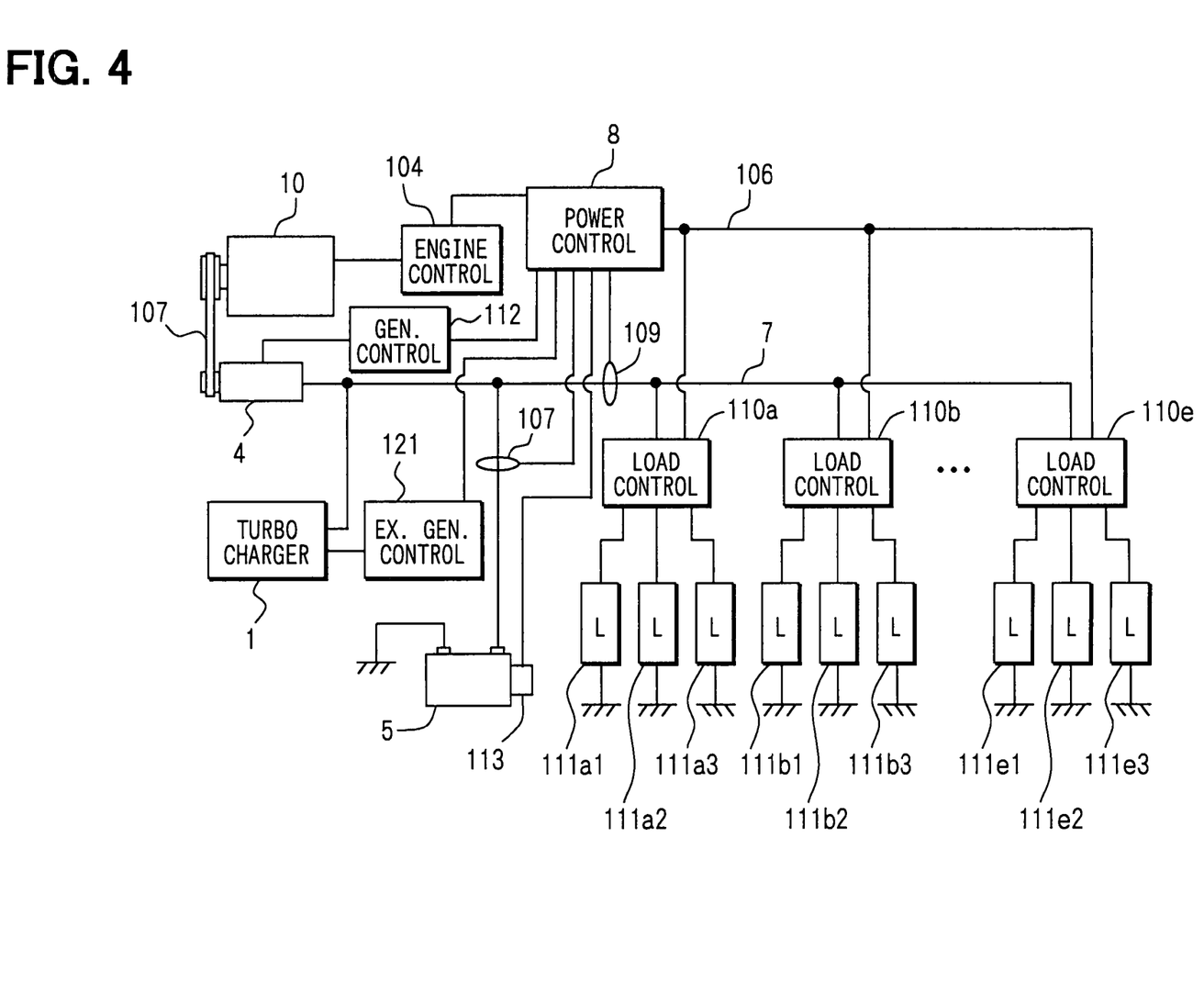
FIG. 4 is a block diagram showing an electric system of a vehicle including a vehicle electric power system according to a second embodiment of the present invention.

A vehicle power system utilizing the power supply system control method of the first embodiment is shown in FIG. 4 as a second embodiment. The vehicle power system of the present embodiment and the power control method are similar to those of a vehicle power system disclosed in US 2004/0164616A1 the contents of which are hereby incorporated by reference.

In FIG. 4, an engine 10 is connected with an AC generator 4 through a belt 107. The generator 4 is connected to a storage battery 5 and load control devices 110a to 110e through a power bus 7.

Similarly, as in the first embodiment, an exhaust gas-driven generator apparatus 1 includes a turbocharger, which rotates by absorbing exhaust energy of the engine 10 and a rotary electric machine directly connected to a rotation shaft of the turbocharger. AC power generated by the rotary electric machine is rectified by an inverter (not shown), and the power is then supplied to the power bus 7.

The load control device 110a performs power supply control for corresponding loads (L), that is, loads 111a1 to 111a3. Similarly, the load control device 110b performs power supply control for corresponding loads 111b1 to 111b3, and the load control device 110e performs power supply control for loads 111e1 to 111e3.

An engine control device 104 is for controlling the engine 10 and connected to a power control device 8. The engine control device 104 sends to the power control device 8 various types of information, such as engine speeds detected by sensors (not shown) that detect various states of the engine 10. In addition, the engine control device 104 performs increment and decrement adjustment of the output of the engine 10 in response to various command received from the power control device 8.

The power control device 8 monitors the states of the generator 4, the battery 5, the exhaust gas-driven generator apparatus 1 and the power bus 7. Then, the power control device 8 controls, for example, the generator 4 and the exhaust gas-driven generator apparatus 1 through a generator control device 112. The generator control device 112 is provided to control, for example, the generator 4 and the exhaust gas-driven generator apparatus 1. The power control device 8 is connected to the generator control device 112. Generation amounts of power of the generator 4 and the exhaust gas-driven generator apparatus 1 are controlled in accordance with respective commands received from the power control device 8.

The generator control device 112 sends generator-related information, such as the present generation amounts of power of the generator 4 and the rotation speed of the generator 4, to the power control device 8. The power control device 8 is connected to a battery current sensor 107, a load current sensor 109, a battery temperature sensor 113, and a battery voltage sensor (not shown), thereby to receive the information of a battery input/output current, load current, battery temperature, and battery voltage.

An exhaust gas-driven generation control device 121 controls the exhaust gas-driven generator apparatus 1, and is connected to the power control device 8.

The power control device 8 is connected to the load control devices 110a to 110e through multiplex signal communication lines 106, and bidirectionally communicates information through multicommunication with the load control devices 110a to 110e. The generator control device 112 receives vehicle-braking information from a vehicle control device (not shown), thereby to control power generation by the generator 4 to a value corresponding to a vehicle-braking amount recognized in accordance with the vehicle braking information. As such, the generator control device 112 causes the field current in the generator 4 to increase to perform regenerative braking, thereby to generate a necessary amount of vehicle braking force (amount of regenerative braking force).

The vehicle control device calculates the amount of braking force corresponding to the amount of operation of a braking device, such as a brake-pedal position sensor (not shown). The vehicle control device thereby issues a command to a control section of a hydraulic brake system (not shown) to generate an amount of braking force by the subtraction of the amount of regenerative braking force from the amount of vehicle braking force.

The generator control device 112 determines the increment amount for the generation amount of power produced by the regenerative braking within a range of a maximum generatable amount of power in the generator 4, and sets the increment amount within a range of a maximum chargeable power value (maximum charging power amount) of the battery 5. In this manner, the generator control device 112 controls the power generation by the generator 4, charge and discharge of the battery 5, and the power consumption of the respective loads.

(Power Control)

Figure 5:
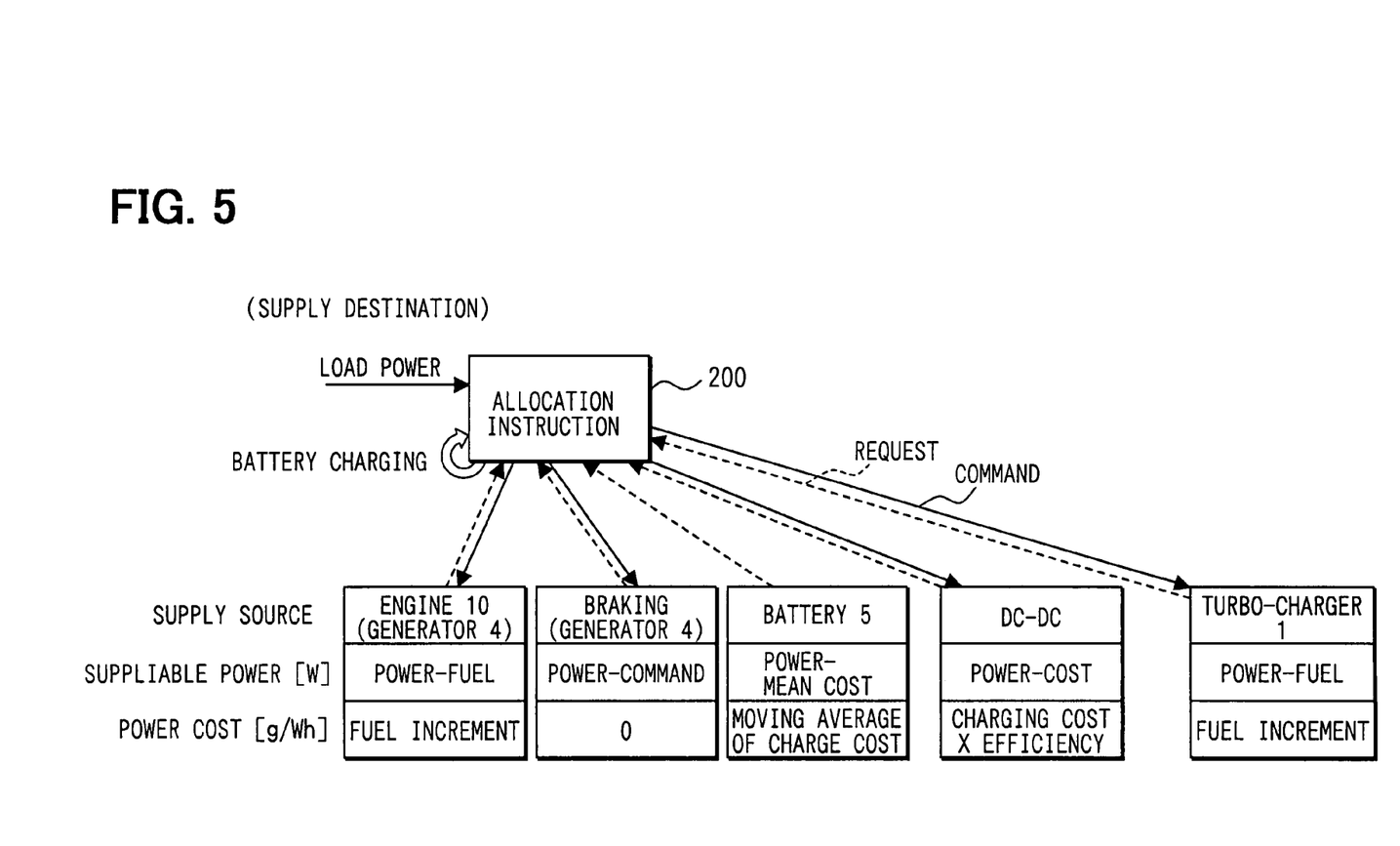
FIG. 5 is a schematic diagram showing an electric system control method according to the second embodiment.

Power control of the electric system to be performed by the power control device 8 will now be described with reference to FIG. 5. The power control includes the following (1) power generation control and (2) power consumption control.

(1) Power Generation Control

The power generation control is operation including determination of an actual power source from a plurality of power supply sources, determination (allocation) of the amount of generating power of the power supply source, and issuance of a command to the power supply source for supplying the power.

The power supply sources can include, for example, the engine 10, a regenerative braking system, the battery 5, other electric systems (not shown) and the exhaust gas-driven generator apparatus 1. The regenerative braking system, functioning as a supply destination of power energy is configured of the generator 4 during regenerative braking and the generator control device 112 that controls the generator 4. The cost per unit amount of power will be referred to as a power cost. This power cost may be defined as DENPI (design of electric network with power index: g/Vh).

The engine 10 as a power supply source supplies power to the power line 108 through the engine-driven generator 4. The power cost of the engine 10, i.e., the cost of power generated by the engine power, is calculated by a generation amount of power with respect to the increment amount of fuel increasing for the power generation.

The regenerative braking system as a power source is connected to the power bus 7 through the generator 4, which is a part of the regenerative braking system. The cost of regenerative power (regenerative power cost) by the regenerative braking system is calculated to be zero (0) in this embodiment for the sake of simplification, where factors such as battery consumption are neglected.

The other power source as a supply source refers to an electrical system such as in-vehicle battery other than the electrical system shown in FIG. 4. An example is a commercial power supply system of an electric vehicle which system is connected for being charged while the vehicle is being parked. For example, ordinarily a hybrid vehicle has a high voltage battery and a low voltage battery. When the power supply in an electrical system of the type shown in FIG. 4 wherein the high voltage battery is connected becomes insufficient, power can be alternatively supplied from the low voltage battery system through a DC-DC converter (not shown). The power cost of the other power source can be obtained through the multiplication of the cost of charging the low voltage battery by, for example, the charge and discharge efficiency or DC-DC converter.

The source of exhaust gas-driven generation as a supply source supplies the power to the power bus 7 through the exhaust gas-driven generator apparatus 1. The cost of power generated by utilizing the exhaust energy of the engine (exhaust gas-driven generation cost) corresponds to the increment amount of fuel necessary for the power generation of unit amount of power. The power cost of the exhaust gas-driven generation is lower as the engine output is higher. In the case that the engine output is higher than or equal to the predetermined level, exhaust energy being discarded at the waste gate of the turbocharger can be converted to a power cost of zero (0).

The battery 5 is charged with the power supplied from the engine 10 through the generator 4 and with the power from the regenerative braking system, the power from the exhaust gas-driven generator apparatus 1 or the power supplied (charged) from an external power source through the power lines 108.

The battery power cost, i.e., the cost of the power being supplied by the battery 5, is thus time dependent on the allocation ratios of the engine energy cost, purchased energy cost, regenerative energy cost, and exhaust gas-driven generation cost. As such, the present embodiment uses a moving average of charge costs fluctuating depending on the charge and discharge history of the battery 5, in order to attain reflection, with highest possible fidelity, of the cost of power energy having been charged.

(2) Power Consumption Control

The power consumption control includes determination of an actual supply destination, to which an amount of power (consumptive amount of power) should actually be supplied, from a plurality of supply destinations (consumption ends) that carry out power consumption (accumulation), determination (allocation) of the amount of power of the supply source, and issuance of a command to the supply destination for supplying the power.

The power control device 8 performs control in accordance with a total request amount of power for the system, which is a sum of a charge request amount of power for the battery 5 and a load request power for a respective one of the loads 111$a$1 to 111$e$3, and a total generatable amount of power, which is a presently generatable amount of power in the system. When the total generatable amount of power is greater than or equal to the total request amount of power, the power control device 8 generates the total request amount of power. When the total generatable amount of power is smaller than the total request amount of power, the power control device 8 generates the total generatable amount of power corresponding to the total request amount of power, or reduces the total request amount of power to a maximum value of the total generatable amount of power.

The above power control is specifically performed in accordance with, for example, a power supply command or consumption command issued by an allocation instructing section 200 of the power control device 8. In response to a requested amount of power for respective one of the electrical loads 111$a$1 to 111$e$3 and a requested amount of power (consumptive amount of power) made of a charge amount of power to the battery 5, the allocation instructing section 200 issues respective power supply commands for power supply from the respective power supply destinations, namely, the supply destinations of engine power generation, regenerative power generation, battery discharge, other power source and exhaust gas-driven generation.

The allocation instructing section 200 stores information (relation) of suppliable amounts of power (suppliable amounts) and power costs thereof. More specifically, for the engine power generation, there are stored maximum suppliable amounts of power at present engine speeds, fuel costs for generating the corresponding maximum suppliable amounts, recommended supply amounts of power, and fuel costs for generating the corresponding recommended amounts. Those may be determined based on various limitations that, for instance, power generation by the generator should be restricted during acceleration of the engine 10.

For the regenerative power generation, there are stored generation amounts of power (=zero (0)) corresponding to commands from the regenerative braking system. For the battery discharge, there are stored dischargeable amounts of power (variable depending on, for example, the temperature, residual capacity, or deterioration state) of the battery 5 and mean power costs in accordance with past charge histories of the battery 5. For the power supply by the other power source, there are stored suppliable amounts of power by the other power source and power costs therefor.

For the exhaust gas-driven generation, respective generatable amounts of power, which are generatable by exhaust gas-driven generation, determined corresponding to present operating points of the engine (engine speeds and engine output torques) are set to suppliable amounts of power, the allocation instructing section 200 stores respective increment amounts of fuel of the engine 10 necessary for generating the corresponding to suppliable amounts of power.

In the event of generating the respective suppliable amounts of power by the exhaust gas-driven generation, the increment amount of fuel indicates the amount of fuel that should be increased to obtain an engine output torque substantially the same as that in the event that the power generation is not performed. The present embodiment may use mapped data (not shown) or model indicative of respective relationships between suppliable amounts of power and increment amounts of fuel, thereby to obtain or calculate the increment amounts of fuel. With this, engine control synchronous with exhaust gas-driven generation can be implemented, consequently enabling variations in the engine output torque to be restrained.

The allocation instructing section 200 securely recognizes the requested amount of power (load request amount of power) of the respective electrical load, and determines a command value of the load power for being actually supplied to the load. Then, a supply amount of power matching with the determined load power command value is allocated to the respective supply source. In the allocation, higher priority is given to the supply source as the power cost thereof is lower. In the respective supply source, since the power generation is performed in accordance with an allocation command with such priority, the power at a lower power cost is used with priority, consequently implementing reduction in the power cost.

The present invention should not be limited to the above embodiments, but may be implemented in many other ways.

What is claimed is:

1. A method of controlling an electrical system that performs power supply to an electrical load and a battery from a plurality of power energy supply sources including an exhaust gas-driven generator that performs power generation by utilizing exhaust energy of an engine and a generator that performs power generation by utilizing drive forces of the engine, the method comprising the steps of:
   obtaining information for calculating power costs;
   calculating, from the obtained information, power costs coinciding with a cost per unit amount of electric power of respective ones of the power energy supply sources and suppliable amounts of power of the respective power energy supply sources;
   adjusting power flow characteristics of the electrical system by adjusting power supply allocation ratios of the power energy supply sources and a received power allocation ratio of the electrical load or a battery in accordance with the calculated power costs in a direction along which power energy is reduced, wherein for the exhaust gas-driven generator, a generatable amount of power indicating an amount of power generatable by the exhaust gas-driven generator, the amount of power being determined corresponding to an operating point of the engine, is used as the suppliable amount of power;
   determining an increment amount of fuel for the engine which increment amount is necessary for generation of the suppliable amount of power to be used as the power cost;
   supplying the increment amount of fuel to the engine additionally when operating the exhaust gas-driven generator; and
   modifying the operating point of the engine as a result of additionally supplying the increment amount of fuel to the engine.

2. The method of controlling an electrical system according to claim 1, wherein the increment amount of fuel is an amount of fuel to be increased to obtain an output torque of the engine that is substantially the same as an output torque when power generation is not performed in the event that the generatable amount of power is generated by the exhaust gas-driven generator.

3. The method of controlling an electrical system according to claim 2, wherein the increment amount of fuel is calculated by using a map or a model, the map indicating a relationship between the generatable amount of power and the increment amount of fuel.

4. A method of controlling an electrical system that performs power supply to an electrical load and a battery from a plurality of power energy supply sources including an exhaust gas-driven generator that performs power generation by utilizing exhaust energy of an engine and an engine-driven generator that performs power generation by utilizing drive force of the engine, the method comprising the steps of:
   detecting an operating point of the engine;
   determining, based on the operating point of the engine, a generatable amount of power indicating an amount of power generatable by the exhaust gas-driven generator based on the operating point of the engine;
   determining an increment amount of fuel to be supplied to the engine to generate the generatable amount of power by the exhaust gas-driven generator, the increment amount of fuel being smaller than an increment amount of fuel to be supplied to the engine for generating a same amount of power by the engine-driven generator;
   supplying the engine with the increment amount of fuel additionally; and
   generating power by the exhaust-driven generator.

5. The method of controlling an electrical system according to claim 4, wherein the increment amount of fuel is an amount of fuel to be increased to maintain a same output torque of the engine as in a case where no power is generated by the exhaust gas-driven generator.

6. The method of controlling an electrical system according to claim 5, wherein the increment amount of fuel is calculated by using a map or a model, the map indicating a relationship between the generatable amount of power and the increment amount of fuel.

* * * * *